(12) United States Patent
Watkins

(10) Patent No.: US 8,708,004 B2
(45) Date of Patent: Apr. 29, 2014

(54) SYSTEM AND METHOD FOR DELIVERING FUEL TO AN AIRCRAFT FROM A VEHICLE

(76) Inventor: Owen Watkins, East Fallowfield, PA (US)

(*) Notice: Subject to any disclaimer, the term of this patent is extended or adjusted under 35 U.S.C. 154(b) by 783 days.

(21) Appl. No.: 12/881,591

(22) Filed: Sep. 14, 2010

(65) Prior Publication Data

US 2011/0061740 A1    Mar. 17, 2011

Related U.S. Application Data

(60) Provisional application No. 61/242,435, filed on Sep. 15, 2009.

(51) Int. Cl.
*B65B 1/30* (2006.01)

(52) U.S. Cl.
USPC .............. 141/192; 141/5; 141/94; 73/1.16; 73/861.42

(58) Field of Classification Search
USPC ........... 141/4, 5, 95, 192, 9; 73/1.16, 861.42
See application file for complete search history.

(56) References Cited

U.S. PATENT DOCUMENTS

| | | | |
|---|---|---|---|
| 5,771,946 A * | 6/1998 | Kooy et al. ................ 141/82 |
| 6,082,392 A | 7/2000 | Watkins, Jr. | |
| 6,216,719 B1 * | 4/2001 | Meyer .................. 137/68.14 |
| 6,324,840 B1 | 12/2001 | Watkins | |
| 6,681,815 B1 * | 1/2004 | Westrich et al. ............. 141/95 |
| 7,327,045 B2 | 2/2008 | Watkins | |
| 2011/0030839 A1 * | 2/2011 | Lohmann et al. ............. 141/4 |

* cited by examiner

*Primary Examiner* — Jason K Niesz
(74) *Attorney, Agent, or Firm* — RatnerPrestia

(57) ABSTRACT

A fueling control system for providing fuel from a vehicle to an aircraft, and a method of providing fuel from a fuel vehicle to an aircraft are disclosed herein. The fueling control system includes a pressure transducer for sensing back pressure in a fluid path to a fuel tank of an aircraft, and a digital controller coupled to the pressure transducer for receiving the back pressure in the fluid path and controlling fuel flow in the fluid path to the aircraft. The method includes the steps of sensing back pressure in a fluid path from the aircraft; receiving the sensed back pressure by a digital controller; and controlling fuel flow to the aircraft in the fluid path based on the sensed back pressure.

12 Claims, 5 Drawing Sheets

SYSTEM AND METHOD FOR DELIVERING FUEL TO AN AIRCRAFT FROM A VEHICLE

CROSS-REFERENCE TO RELATED APPLICATION

This patent application claims priority to U.S. Patent Application No. 61/242,435, filed Sep. 15, 2009, which is incorporated by reference herein in its entirety.

FIELD OF THE INVENTION

The invention relates to a fuel vehicle that is equipped with a system for delivering fuel to an aircraft, and a method for delivering fuel to an aircraft.

BACKGROUND OF THE INVENTION

The invention relates to a fuel vehicle that is equipped with a system for delivering fuel to an aircraft, and a method for delivering fuel to an aircraft. U.S. Pat. Nos. 6,082,392, 6,324,840 and 7,327,045 to Watkins are incorporated herein by reference in their entirety.

SUMMARY OF THE INVENTION

A fueling control system for providing fuel from a vehicle to an aircraft, and a method of providing fuel from a fuel vehicle to an aircraft are disclosed herein. The fueling control system includes a pressure transducer for sensing back pressure in a fluid path to a fuel tank of an aircraft, and a digital controller coupled to the pressure transducer for receiving the back pressure in the fluid path and controlling fuel flow in the fluid path to the aircraft. The method includes the steps of sensing back pressure in a fluid path from the aircraft; receiving the sensed back pressure by a digital controller; and controlling fuel flow to the aircraft in the fluid path based on the sensed back pressure.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

In the figures, identical item numbers in different figures refer to identical components.

Figure 1:
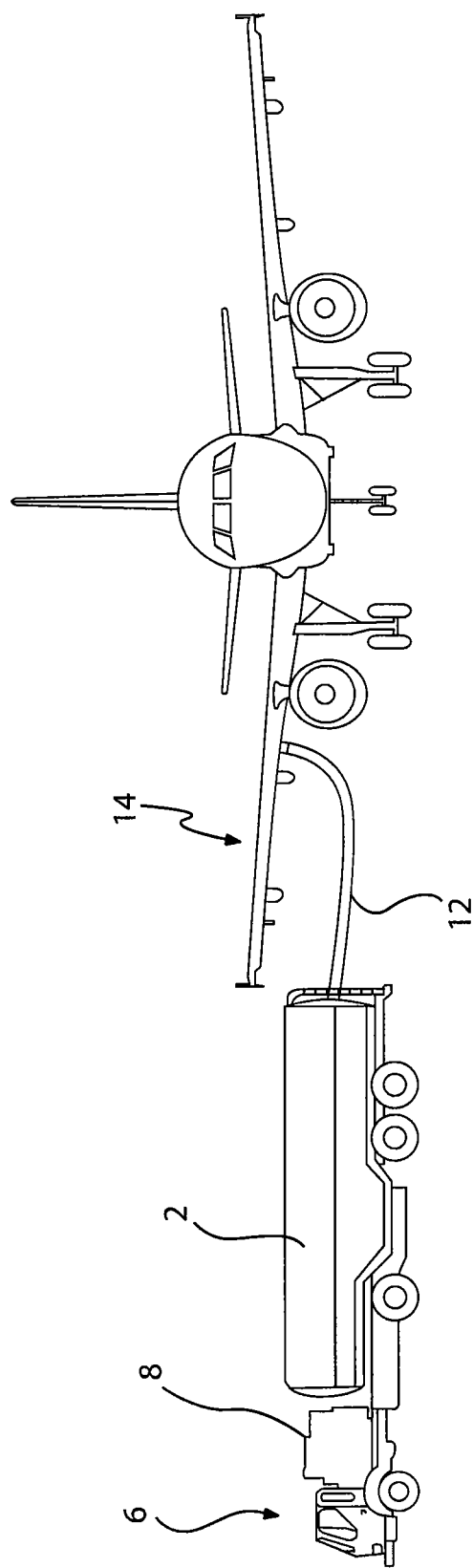
FIG. 1 depicts a schematic illustration of a fuel vehicle having a hose connected to an aircraft to deliver fuel to the aircraft.

Referring to the drawings, FIG. 1 shows a vehicle 6 having a fuel tank 2 and a bulk fuel delivery system 8. A hose 12 that is fluidly connected to the delivery system 8 is connected to the aircraft 14 for refueling purposes. Fuel flows from the fuel tank 2 into the bulk fuel delivery system 8 of the fuel vehicle 6 and through the hose 12 for fueling the aircraft 14. Details of the bulk fuel delivery system are described in greater detail with reference to FIGS. 2-3.

Figure 2:
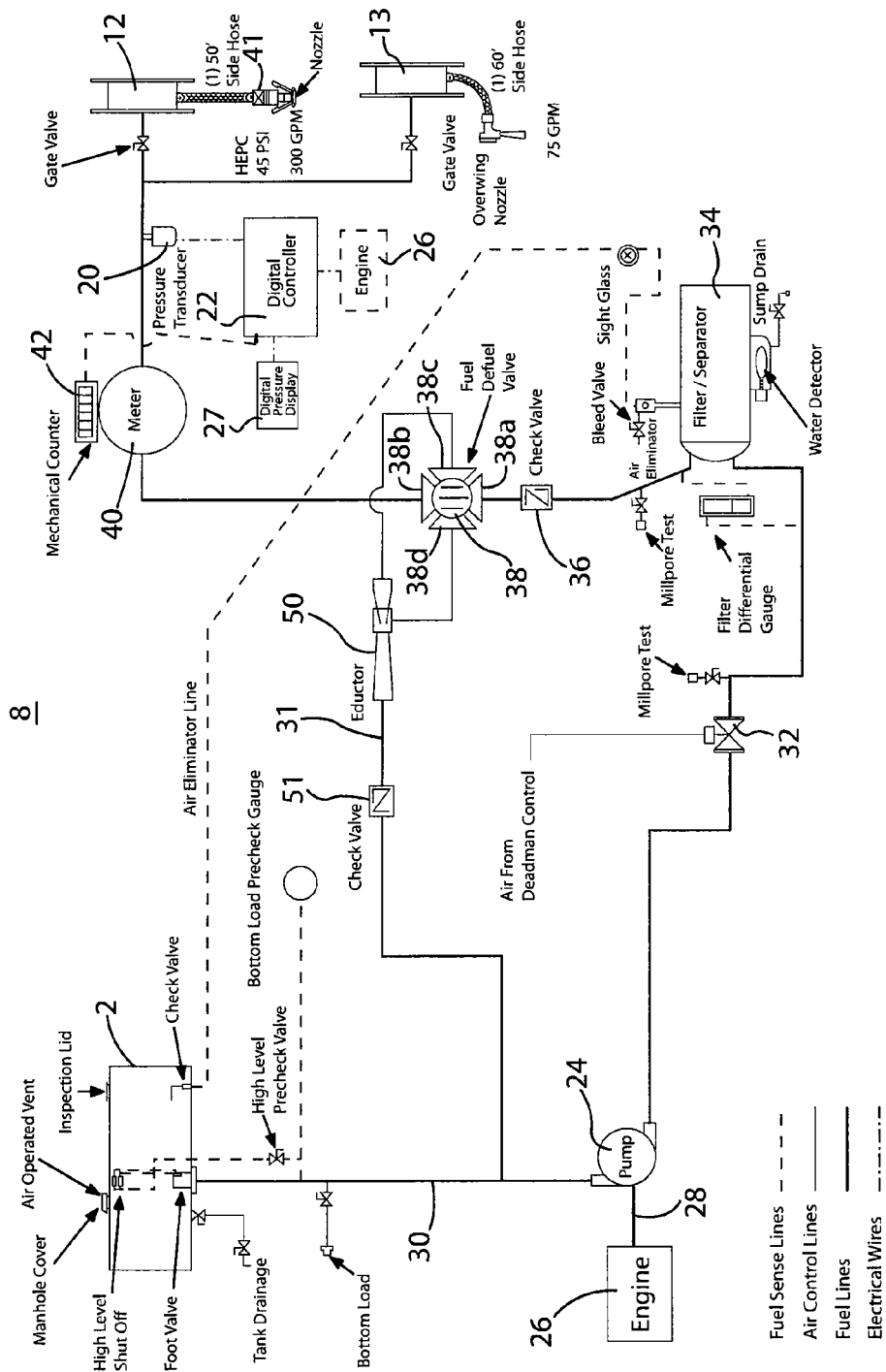
FIG. 2 depicts a schematic illustration of a bulk fuel delivery system according to an exemplary embodiment of the invention.

FIG. 2 depicts a schematic illustration of a bulk fuel delivery system 8 of the vehicle of FIG. 1 according to a first exemplary embodiment of the invention. The bulk fuel delivery system 8 includes a fuel tank 2 for storing fuel that is fluidly connected to a pump 24 by a fluid line 30. Fuel is distributed through the fluid line 30 by the pump 24. The pump 24 is driven by the vehicle engine 26 by way of a power take-off (PTO) shaft 28, such that power is transferred from the engine 26 of the vehicle to the pump 24. PTO shafts are well-known in the art.

A butterfly valve 32 is connected to fluid line 30 downstream of pump 24 for either permitting or preventing passage of fuel through fluid line 30. The butterfly valve 32 is movable between a fully-open position and a fully-closed position. The butterfly valve 32 is controlled by a deadman control (not shown). The deadman control is connected to a pressurized air source. A pilot valve (not shown) is connected between the deadman control and the pressurized air source to control flow of air to the deadman control.

When the pilot valve is maintained in an open position, air is supplied to the deadman control. Upon actuating the deadman control, air is delivered to the pilot valve, thereby opening butterfly valve 32 to permit flow of fuel through valve 32. Alternatively, when the pilot valve is closed, air is not supplied to the deadman control and air is not delivered to valve 32 even if the operator of system 8 actuates the deadman control.

A fuel filter/separator 34 is connected to fluid line 30 for filtering the fuel and removing contaminant particles from the fuel. A check valve 36 and a globe valve 38, also referred to as a fuel-defuel valve 38, is fluidly coupled to fluid line 30 downstream of the fuel filter/separator 34. In a 'fuel' mode of the fuel-defuel valve 38, fuel is transferred from the fuel tank 2 of the vehicle to the aircraft. In operation fuel that is introduced into port 38a of four-way valve 38 is delivered through port 38b of the valve 38, through hoses 12 and/or 13, to the aircraft.

In a 'defuel' mode of the fuel-defuel valve 38, fuel is transferred from the aircraft to the fuel tank 2 of the vehicle. In operation, fuel is distributed through port 38a through port 38c of valve 38 and through eductor 50. The flow of fuel through eductor 50 creates suction at port 38d, resulting in the siphoning of fuel from the aircraft through hose 12, through port 38b, through port 38d of valve 38, through return fluid line 31, to fuel tank 2. General operation of eductor 50 and fuel-defuel valve 38 are known to those skilled in the art.

A fuel meter 40 is fluidly coupled to fluid line 30 downstream of valve 38. The fuel meter 40 includes a visible counter 42 that indicates the amount of fuel that flows through fuel meter 40. The counter 42 also converts the flow rate of fuel through the fuel meter 40 into an electrical signal, which is transmitted to a digital controller 22.

A pressure transducer 20 is fluidly coupled to fluid line 30 downstream of meter 40. The pressure transducer 20 converts fuel pressure from the aircraft (back pressure) into an electrical signal. The pressure transducer 20 communicates with the digital controller 22.

The digital controller 22 processes the fuel back pressure and the flow rate signals transmitted from pressure transducer 20 and the counter 42, respectively, to adjust speed of engine 26, as described below. Further details of digital controller 22 are described with reference to FIG. 3. A digital pressure display 27 communicates with digital controller 22 to display fuel pressure to an operator of bulk fuel delivery system 8.

A hose 12 and its associated gate valve are fluidly coupled to fluid line 30. A nozzle at the end of hose 12 may be connected to an aircraft (or other vehicle) to zo deliver fuel to a tank within the aircraft (not shown). The nozzle of hose 12 includes a hose end pressure controller (HEPC) configured to deliver fuel at a maximum pressure of 45 PSI. If the fuel pressure exceeds 45 PSI, the HEPC is configured to close a valve 41 in the nozzle to prevent the passage of fuel through the nozzle. The HEPC is an optional component of hose 12, and may be omitted without departing from the scope or spirit of the invention. A second hose 13 and its associated gate valve are also fluidly coupled to fluid line 30. A nozzle at the end of the hose 13 may be connected to an aircraft (or other vehicle) to deliver fuel to another tank within the aircraft (not shown).

Figure 3:
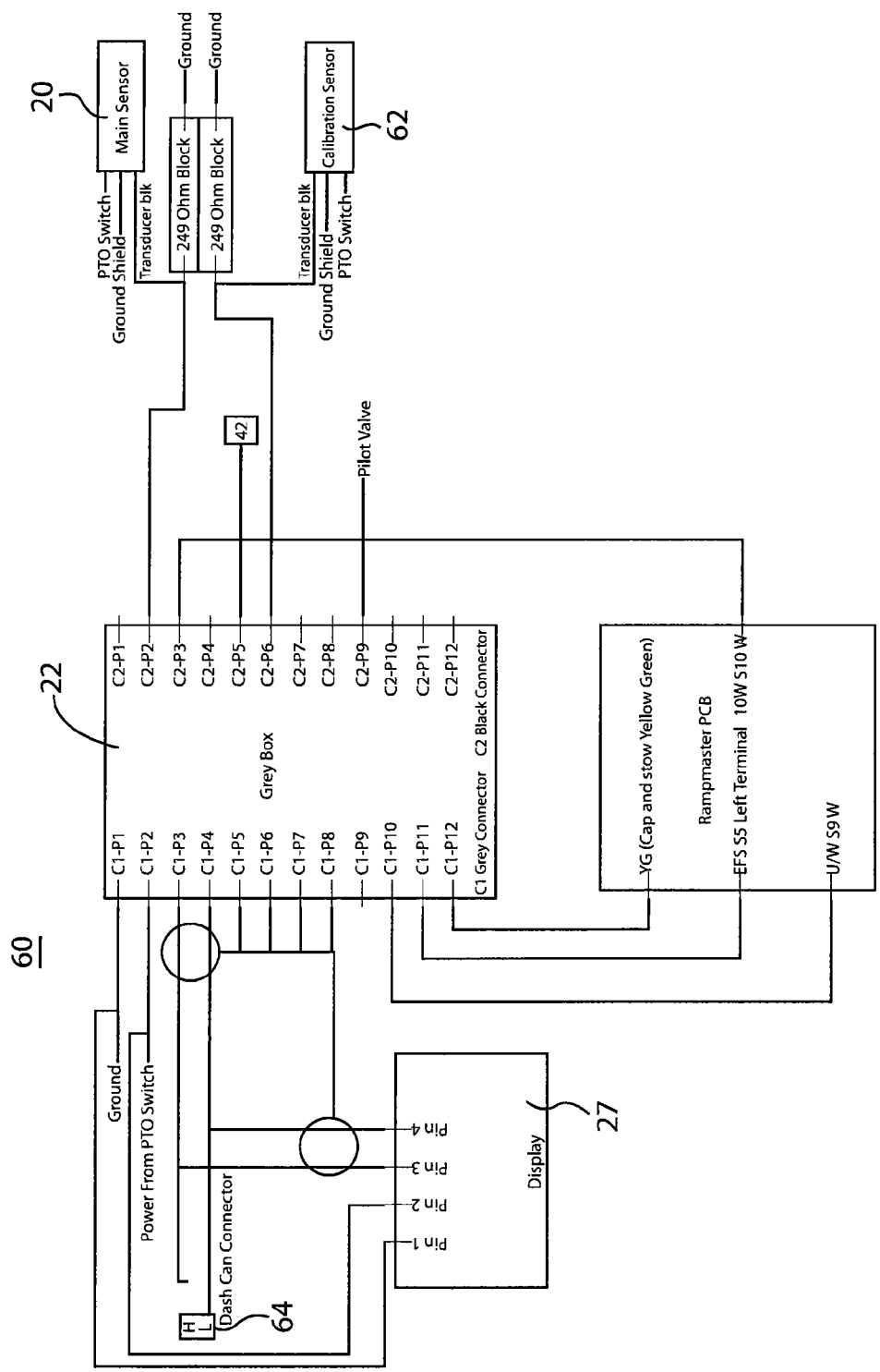
FIG. 3 depicts a schematic illustration of a control system for the bulk fuel delivery system of FIG. 2.

FIG. 3 depicts a schematic illustration of a control system 60 for bulk fuel delivery system 8 of FIG. 2. The control system 60 generally includes digital controller 22. The digital controller 22 communicates with pressure transducer 20, digital pressure display 27, a calibration sensor 62, and an ECU (engine control unit) connector 64. The digital controller 22 may communicate on a SAE J1939 datalink. The pressure transducer 20 senses the fuel back pressure and transmits corresponding electrical signals to digital controller 22. The counter 42 senses the flow rate of the fuel and transmits corresponding electrical signals to digital controller 22. The digital pressure display 27 displays calibrated pressure from pressure transducer 20. The calibration sensor 62 is mounted within the nozzle attached to hose 12 and is used only during limited calibration to determine the pressure drop across hose 12. The calibration sensor 62 communicates with digital controller 22. The connector 64 taps into the engine control unit (ECU) of the vehicle and provides a stream of data to digital controller 22.

The digital controller 22 also communicates with the pilot valve (pin P9 of controller 22) which is connected to the deadman control. The controller 22 transmits a signal to the pilot valve that either opens the pilot valve or closes the pilot valve. When the pilot valve is open, air is supplied to the deadman control. Upon actuating the deadman control by an operator, if the pilot valve is open, air is delivered to the valve, thereby opening butterfly valve 32 to permit flow of fuel through the valve 32 toward hoses 12 and 13. Alternatively, when the pilot valve is closed, air is not supplied to the deadman control.

The calibration sensor 62 is a pressure transducer that is mounted in the nozzle attached to hose 12 for initial calibration of system 8. The calibration sensor 62 is used to characterize the pressure loss of system 8 due to the length of hose 12 for various fuel flow rates through the hose. The calibration sensor 62 is removed from system 8 after the system is characterized.

In operation, calibration sensor 62 may be used to determine the drop in pressure across system 8 as follows: the nozzle is inserted in a tank of the aircraft. The engine of the truck is operated so that pump 24 delivers 100 gallons per minute (for example) to the nozzle. Calibration sensor 62 measures the back pressure from the aircraft fuel tank at the nozzle and pressure transducer 20 measures the back pressure at the other end of hose 41. The difference between the calibration sensor measurement and the pressure transducer measurement provides the ΔP drop (PSI) that is due to system 8.

Similarly, the engine may be turned on to deliver a higher speed, so that pump 24 provides 200 gallons per minute (for example) to the nozzle at the aircraft fuel tank. Again, calibration sensor 62 measures the pressure at one end of hose 41, while pressure transducer 20 measures the pressure at the other end of hose 41. The difference between these two readings provides a drop of pressure (ΔP) due to system 8, when the system is delivering 200 gallons per minute (for example). Similarly, the speed of the engine may be increased, so that pump 24 delivers 300 gallons per minute (for example) at the nozzle attached to the aircraft. Again, calibration sensor 62 and pressure transducer 20 measures the pressure at each respective end of hose 41. The difference between the two pressure measurements provides the pressure drop (ΔP) for system 8, when the pump is delivering 300 gallons per minute (for example).

Figure 4:
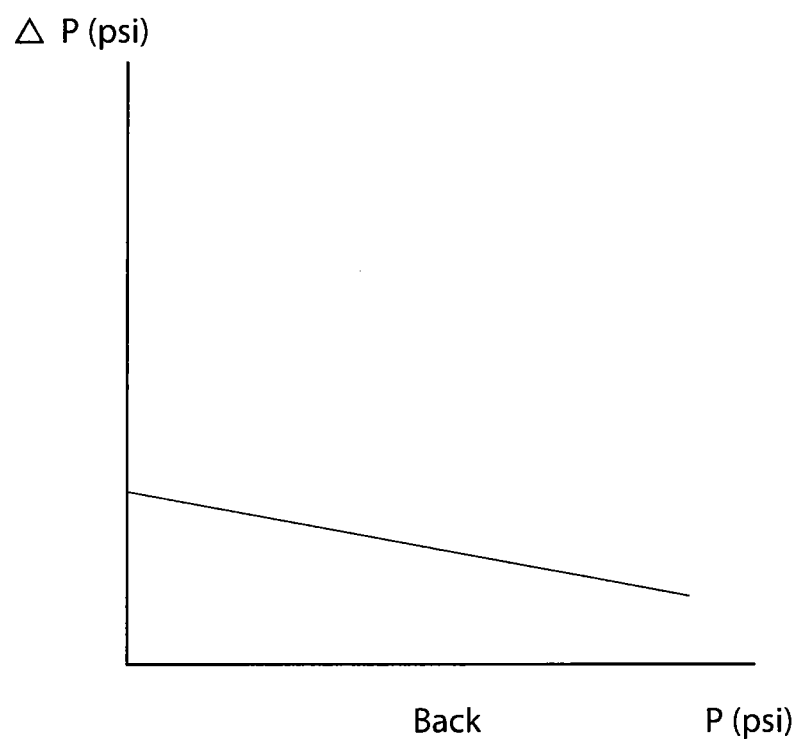
FIG. 4 is a plot of a drop in pressure across a system versus the back pressure sensed at a nozzle fueling an aircraft, in accordance with an embodiment of the present invention.

FIG. 4 shows an exemplary plot of the drop in system pressure (ΔP) for system 8 versus the back pressure (for example the back pressure measured by calibration sensor 62, or the back pressure measured by pressure transducer 20). It will be appreciated that a calibration curve, such as that shown in FIG. 4, may be provided for every nozzle that is attached to the aircraft. For example, the HEPC nozzle may provide one curve, while additional HEPC nozzles may provide a different curve. Each curve is stored in digital controller 22, so that the digital controller may set and control the speed of the engine and may control the flow rate of the fuel as desired by the operator.

The digital controller 22 communicates with the ECU of the vehicle, via connector 64 (pins P3 and P4 of controller 22), and is informed of the speed (for example RPM) of the engine. The digital controller sets the speed of the engine, as further described below.

The control system 60 of bulk fuel delivery system 8 is configured to regulate the back fuel pressure from the nozzle of hose 12 so that it does not to exceed 40 PSI. Specifically, controller 22 is programmed to set fuel pressure, fuel flow rate and engine speed (for example RPM) using three proportional integral derivative (PID) loops. The PID loops maintain fuel pressure, fuel flow rate and engine speed at desired values. Each PID loop corrects any deviation between a measured process variable and a desired setpoint by determining the deviation and providing a corrective action to adjust the process. A PID control algorithm may include three separate parameters, namely, a proportional, an integral and a derivative. The proportional parameter determines the reaction to a current error; the integral determines the reaction based on a sum of recent errors, and the derivative determines the reaction to the rate at which the error is changing. The weighted sum of these three actions may be outputted to a control element to correct the deviation between the measured process variable and the desired set point. According to an embodiment of the invention, the control element is the vehicle's engine. The PID loops adjust the speed of the vehicle's engine to maintain fuel pressure, fuel flow rate and engine speed at desired set points. If the controller 22 fails, the HEPC of hose 12 is configured to close valve 41 in the nozzle to prevent passage of fuel through the nozzle when the fuel pressure reaches 45 PSI. As stated previously, the HEPC is an optional component of hose 12 and may be omitted.

Figure 5:
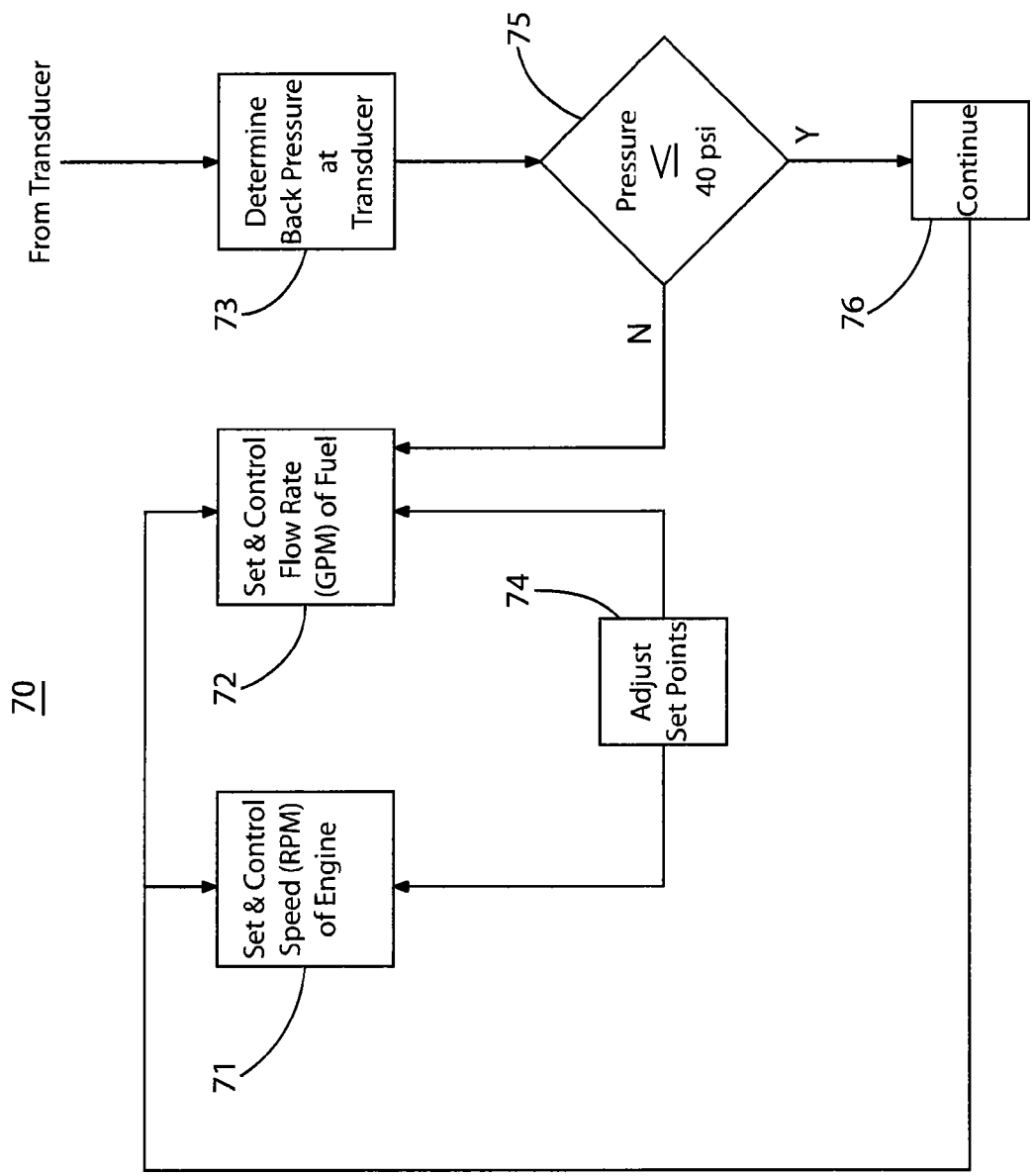
FIG. 5 is a flow diagram showing an exemplary embodiment of the present invention.

Referring to FIG. 5, there is shown an exemplary method of the present invention, generally designated as 70. Method 70 includes three PID loops shown as steps 71, 72 and 73. Step 71 represents a PID loop executed by digital controller 22 for setting and controlling the speed (RPM) of the engine. Step 72 represents a PID loop executed by digital controller 22 for setting and controlling the flow rate of fuel delivered to the aircraft (GPM, for example). Step 73 depicts the beginning of the third PID loop. As shown, step 73 receives the back pressure from transducer 20 and determines the back pressure at the nozzle. The curve, as shown in FIG. 4, may be used to determine the drop of pressure (ΔP) between the nozzle and pressure transducer 20, so that the actual pressure at the nozzle may be obtained.

So long as the engine RPM delivers maximum desired flow rate (for example 300 GPM) and the back pressure at the nozzle is less than 40 PSI (for example), as determined by decision block 75, the system continues, by way of step 76, back to PID loops 71, 72 and 73. If, on the other hand, decision block 75 determines that the pressure is approaching 40 PSI, then steps 72 and 74 are entered to set and control the flow rate of fuel so that the set points into PID loop 71 and PID loop 72 may be adjusted. The adjustment may be provided to lower the speed of the engine, so that the flow rate of fuel to the aircraft fuel tank is reduced and the back pressure at the nozzle does not exceed 40 PSI.

According to one exemplary use of the invention, an operator activates a power take off (PTO) switch in the cabin of the refueling vehicle. The PTO switch transmits a digital input to the transmission of the refueling vehicle to turn on PTO 28. If all engine speed conditions are satisfied, PTO 28 is turned on. The operator deposits a fueling ticket in the ticket printer and then exits the cabin of the vehicle. The operator places the meter register in the RUN position which engages a pilot valve to allow air to flow to a deadman handle. The operator then selects the nozzle of hose 12. After the nozzle is connected to the aircraft, the operator squeezes the deadman handle. Squeezing the deadman handle sends air to a switch. The switch sends a digital input to controller 22 to start the pumping function, while controller 22 limits engine RPM to 1300 (for example) and flow rate to 300 GPM (for example), or any other values. The controller 22 also transmits a signal to open butterfly valve 32.

As the nozzle back pressure reaches 40 PSI, (or any other desired pressure value), the controller reduces engine RPM so that the 40 PSI nozzle back pressure is not exceeded. At this stage of the process, the flow rate does not exceed 300 PSI. Releasing the deadman handle returns the engine back to idle and removes the output to butterfly valve 32 thereby allowing flow control butterfly 32 to close under spring pressure.

According to another exemplary use of the invention, an operator activates a power take off (PTO) switch in the cabin of the refueling vehicle. The operator places the transmission of the vehicle in drive and the pump begins to turn. The operator deposits a fueling ticket in the ticket printer and then exits the cabin of the vehicle. The operator places the meter register in the RUN position which engages the pilot valve to allow air to flow to a deadman handle. The operator selects the nozzle of hose 12. After the nozzle is connected to the aircraft, the operator squeezes the deadman handle. Squeezing the deadman handle sends air to a switch. The switch transmits a digital input to controller 22 to initiate the pumping function limiting engine speed to 1530 RPM (for example) and flow rate to 800 GPM (for example). When the deadman signal reaches controller 22, the controller transmits a signal to open butterfly valve 32. Once the nozzle back pressure reaches 40 PSI, the PID loop pressure causes controller 22 to reduce the engine speed so that the 40 PSI nozzle back pressure is not exceeded. At this stage of the process, the flow rate is unable to exceed 800 GPM (for example). Releasing the deadman handle brings the engine back to idle, and removes the output to butterfly valve 32 thereby allowing butterfly valve 32 to close under spring pressure. If a second single point nozzle is selected, the nozzle switch selects an alternate pressure curve to compensate for its pressure loss during fueling. If a set of nozzles are selected (2 deck or 2 side nozzles, for example), controller 22 uses the pressure curve for the combined set of nozzles and compensates for the pressure loss in the system.

What is claimed:

1. A fueling control system for providing fuel from a vehicle to an aircraft comprising:
    a pressure transducer for sensing back pressure in a fluid path to a fuel tank of an aircraft, and
    a digital controller coupled to the pressure transducer for receiving the back pressure in the fluid path and controlling fuel flow in the fluid path to the aircraft,
    wherein the digital controller is coupled to a pump in the vehicle for controlling speed of the pump for pumping the fuel in the fluid path, and
    the digital controller includes at least two relationships between the back pressure in the fluid path and the flow rate of the fuel in the fluid path stored in a memory device;
    wherein one relationship sets a first speed of the pump to control pumping of the fuel at a first rate, and
    a second relationship sets a second speed of the pump to control pumping of the fuel at a second rate; and
    the first and second rates are dependent on the sensed first and second back pressures in the fluid path, respectively.

2. The system of claim 1 including an engine coupled between the pump and the digital controller, wherein the digital controller is configured to control speed of the engine.

3. The system of claim 1 including a valve coupled between the pump and the fluid path for activating flow of fuel from the fuel tank of the vehicle to the fluid path, wherein the digital controller controls activation of the valve.

4. The system of claim 1 wherein the digital controller is configured to control (a) the back pressure in the fluid path and (b) the flow rate of the fuel in the fluid path.

5. The system of claim 1 wherein the relationship is based on a type of nozzle used for fueling the aircraft.

6. The system of claim 1 including a fuel tank of an aircraft, and
    wherein the relationship includes a plot of (a) pressure drop between the fuel tank of the aircraft and the fluid path versus (b) a flow rate of the fuel.

7. The system of claim 1 wherein the digital controller communicates with an engine of the vehicle by way of a digital data bus.

8. A method of providing fuel from a fuel vehicle to an aircraft comprising the steps of:
    (a) sensing back pressure in a fluid path from the aircraft;
    (b) receiving the sensed back pressure by a digital controller; and
    (c) controlling fuel flow to the aircraft in the fluid path based on the sensed back pressure;
    wherein step (c) includes controlling the rate of flow based on data depicting (i) pressure drop between the aircraft and a pressure sensor and (ii) a flow rate of the fuel, and
    said data includes first and second pressure drops correspond to first and second flow rates, wherein the first and second flow rates are different from each other.

9. The method of claim 8 wherein
    step (c) includes controlling fuel flow by the digital controller.

10. The method of claim 8 wherein
    step (c) includes controlling rate of flow of the fuel by the digital controller.

11. The method of claim 10 wherein step (c) includes activating a valve coupled to the fluid path by the digital controller.

12. The method of claim 10 wherein step (c) includes controlling the rate of flow based on a type of nozzle used to fuel the aircraft.

* * * * *

US008708004C1

(12) EX PARTE REEXAMINATION CERTIFICATE (54th)
Ex Parte Reexamination Ordered under 35 U.S.C. 257

United States Patent
Watkins

(10) Number: US 8,708,004 C1
(45) Certificate Issued: Jun. 24, 2016

(54) SYSTEM AND METHOD FOR DELIVERING FUEL TO AN AIRCRAFT FROM A VEHICLE

(76) Inventor: Owen Watkins, East Fallowfield, PA (US)

Supplemental Examination Request:
No. 96/000,097, Jul. 15, 2015

Reexamination Certificate for:
Patent No.: 8,708,004
Issued: Apr. 29, 2014
Appl. No.: 12/881,591
Filed: Sep. 14, 2010

Related U.S. Application Data

(60) Provisional application No. 61/242,435, filed on Sep. 15, 2009.

(51) Int. Cl.
*F04B 23/04* (2006.01)
*A41C 1/02* (2006.01)

(52) U.S. Cl.
CPC .......................................... *A41C 1/02* (2013.01)

(58) Field of Classification Search
CPC ....... F04B 23/04; F04B 49/20; F04B 2205/05

USPC ............................. 222/71, 73, 385, 239, 222
See application file for complete search history.

(56) References Cited

To view the complete listing of prior art documents cited during the supplemental examination proceeding and the resulting reexamination proceeding for Control Number 96/000,097, please refer to the USPTO's public Patent Application Information Retrieval (PAIR) system under the Display References tab.

*Primary Examiner* — Matthew C Graham

(57) ABSTRACT

A fueling control system for providing fuel from a vehicle to an aircraft, and a method of providing fuel from a fuel vehicle to an aircraft are disclosed herein. The fueling control system includes a pressure transducer for sensing back pressure in a fluid path to a fuel tank of an aircraft, and a digital controller coupled to the pressure transducer for receiving the back pressure in the fluid path and controlling fuel flow in the fluid path to the aircraft. The method includes the steps of sensing back pressure in a fluid path from the aircraft; receiving the sensed back pressure by a digital controller; and controlling fuel flow to the aircraft in the fluid path based on the sensed back pressure.

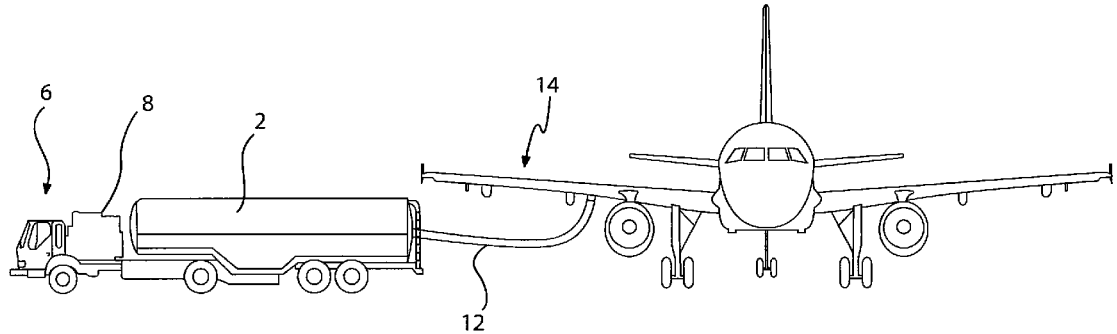

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-7 is confirmed.

Claim 8 is determined to be patentable as amended.

Claims 9-12, dependent on an amended claim, are determined to be patentable.

8. A method of providing fuel from a fuel vehicle to an aircraft comprising the steps of:
   (a) sensing back pressure in a fluid path from the aircraft;
   (b) receiving the sensed back pressure by a digital controller; and
   (c) controlling fuel flow to the aircraft in the fluid path based on the sensed back pressure;
   wherein step (c) includes controlling the rate of flow based on data depicting (i) pressure drop between the aircraft and a pressure sensor and (ii) a flow rate of the fuel, and
   said data includes first and second pressure drops *that correspond to first and second flow rates, wherein the first and second flow rates are different from each other, and wherein relationships between the first and second pressure drops and the first and second flow rates are stored in a memory device of the digital controller*.

\* \* \* \* \*